United States Patent
Chen et al.

(10) Patent No.: US 11,334,814 B2
(45) Date of Patent: May 17, 2022

(54) METHOD AND APPARATUS FOR TRAINING A LEARNING MACHINE

(71) Applicant: Microsoft Technology Licensing, LLC, Redmond, WA (US)

(72) Inventors: Kai Chen, Beijing (CN); Qiang Huo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 777 days.

(21) Appl. No.: 16/078,983

(22) PCT Filed: Mar. 18, 2016

(86) PCT No.: PCT/CN2016/076808
§ 371 (c)(1),
(2) Date: Aug. 22, 2018

(87) PCT Pub. No.: WO2017/156791
PCT Pub. Date: Sep. 21, 2017

(65) Prior Publication Data
US 2019/0050743 A1 Feb. 14, 2019

(51) Int. Cl.
*G06N 20/00* (2019.01)
*G06K 9/62* (2022.01)
*G06N 5/04* (2006.01)

(52) U.S. Cl.
CPC ........... *G06N 20/00* (2019.01); *G06K 9/6256* (2013.01); *G06N 5/043* (2013.01)

(58) Field of Classification Search
CPC ....... G06N 20/00; G06N 5/043; G06K 9/6256
See application file for complete search history.

(56) References Cited

U.S. PATENT DOCUMENTS

| 8,027,938 B1 | 9/2011 | Xu et al. |
| 9,235,813 B1 | 1/2016 | Qian et al. |

(Continued)

FOREIGN PATENT DOCUMENTS

| CN | 102072922 A | 5/2011 |
| CN | 103745225 A | 4/2014 |
| CN | 104463324 A | 3/2015 |

OTHER PUBLICATIONS

Moritz, Philipp, et al. "Sparknet: Training deep networks in spark." arXiv preprint arXiv:1511.06051 (2015). (Year: 2015).*

(Continued)

*Primary Examiner* — Eric Nilsson
(74) *Attorney, Agent, or Firm* — Schwegman Lundberg & Woessner, P.A.

(57) ABSTRACT

The disclosure relates to a method and apparatus for training a learning machine, wherein the apparatus includes: a broadcasting module for broadcasting an initial global model for a training cycle to a plurality of worker nodes; a receiving module for receiving a plurality of updated local models from the plurality of worker nodes, wherein each updated local model is generated by one of the plurality of worker nodes independently based on a data split assigned to the worker node and the initial global model for the training cycle; an aggregating module for aggregating the plurality of updated local models to obtain an aggregated model; and a generating module for generating an updated global model for the training cycle based at least on the aggregated model and historical information which is obtained from a preceding training cycle.

18 Claims, 4 Drawing Sheets

(56) References Cited

U.S. PATENT DOCUMENTS

| | | | |
|---|---|---|---|
| 10,152,676 B1* | 12/2018 | Strom | G06N 7/005 |
| 2011/0295567 A1 | 12/2011 | Thiesson et al. | |
| 2015/0134576 A1 | 5/2015 | Shotton et al. | |
| 2015/0339572 A1 | 11/2015 | Achin et al. | |
| 2015/0348069 A1 | 12/2015 | Fano et al. | |
| 2016/0073969 A1 | 3/2016 | Ithapu et al. | |
| 2017/0147920 A1 | 5/2017 | Huo et al. | |

OTHER PUBLICATIONS

Povey, Daniel, Xiaohui Zhang, and Sanjeev Khudanpur. "Parallel training of DNNs with natural gradient and parameter averaging." arXiv preprint arXiv:1410.7455 (2014). (Year: 2014).*

Dean, Jeffrey, et al. "Large scale distributed deep networks." (2012). (Year: 2012).*

Chen, Kai, and Qiang Huo. "Scalable training of deep learning machines by incremental block training with intra-block parallel optimization and blockwise model-update filtering." 2016 ieee international conference on acoustics, speech and signal processing (icassp). IEEE, 2016. (Year: 2016).*

"International Search Report and Written Opinion Issued in PCT Application No. PCT/CN2016/076808", dated Jan. 5, 2017, 11 Pages.

Bluche, et al., "Framewise and CTC Training of Neural Networks for Handwriting Recognition", In Proceedings of the 13th International Conference on Document Analysis and Recognition, Aug. 23, 2015, pp. 81-85.

Boyd, et al., "Distributed Optimization and Statistical Learning via the Alternating Direction Method of Multipliers", In Proceedings of the Foundations and Trends in Machine Learning, vol. 3, No. 1, Jan. 2011, 125 Pages.

Chen, et al., "A Context-Sensitive-Chunk BPTT Approach to Training Deep LSTM/BLSTM Recurrent Neural Networks for Offline Handwriting Recognition", In Proceedings of the13th International Conference on Document Analysis and Recognition, 2015, pp. 411-415.

Cieri, et al., "The Fisher Corpus: A Resource for the Next Generation of Speech-to-Text", In Proceedings of the 4th International Conference on Language Resources and Evaluation, May 2004, pp. 69-71.

Coates, et al., "Deep Learning with COTS HPC Systems", In Proceedings of the 30th International Conference on Machine Learning, vol. 28, Jun. 16, 2013, 9 Pages.

Dahl, et al., "Context-Dependent Pre-Trained Deep Neural Networks for Large-Vocabulary Speech Recognition", In Proceedings of the IEEE Transactions on Audio, Speech, and Language Processing, vol. 20, No. 1, Jan. 2012, pp. 30-42.

Dean, et al., "Large Scale Distributed Deep Networks", In Proceedings of the 26th Annual Conference on Neural Information Processing Systems, Dec. 3, 2012, 11 Pages.

Yu, et al., "Automatic Speech Recognition: A Deep Learning Approach", Published by Springer London, 2015, 329 Pages.

Godfrey, et al., "Switchboard: Telephone Speech Corpus for Research and Development", In Proceedings of the IEEE International Conference on Acoustics, Speech, and Signal Processing, Mar. 23, 1992, pp. I-517-I-520.

Graves, et al., "Hybrid Speech Recognition with Deep Bidirectional LSTM", In Proceedings of IEEE Workshop on Automatic Speech Recognition and Understanding, Dec. 8, 2013, 6 Pages.

Graves, et al., "Speech Recognition with Deep Recurrent Neural Networks", In Proceedings of the IEEE International Conference on Acoustics, Speech and Signal Processing, May 26, 2013, pp. 6645-6649.

Graves, et al., "Towards End-to-End Speech Recognition with Recurrent Neural Networks", In Proceedings of the 31st International Conference on Machine Learning, Jan. 27, 2014, 9 Pages.

He, et al., "Delving Deep Into Rectifiers: Surpassing Human-Level Performance on ImageNet Classification", In Proceedings of the IEEE International Conference on Computer Vision, Dec. 7, 2015, pp. 1026-1034.

Heigold, et al., "Asynchronous Stochastic Optimization for Sequence Training of Deep Neural Networks", In Proceedings of the IEEE International Conference on Acoustic, Speech and Signal Processing, May 4, 2014, pp. 5624-5628.

Heigold, et al., "Multilingual Acoustic Models Using Distributed Deep Neural Networks", In Proceedings of International Conference on Acoustics, Speech and Signal Processing, May 26, 2013, 5 Pages.

Hinton, et al., "Deep Neural Networks for Acoustic Modeling in Speech Recognition: The Shared Views of Four Research Groups", In IEEE Signal Processing Magazine, vol. 29, Issue 6, Nov. 1, 2012, pp. 82-97.

Jiang, et al., "Rectified Linear Neural Networks with Tied-Scalar Regularization for LVCSR", In Proceedings of the 16th Annual Conference of the International Speech Communication Association, 2015, 5 Pages.

Krizhevsky, et al., "ImageNet Classification with Deep Convolutional Neural Networks", In Advances in Neural Information Processing Systems, Dec. 2012, 9 Pages.

Maas, et al., "Increasing Deep Neural Network Acoustic Model Size for Large Vocabulary Continuous Speech Recognition", In Repository of arXiv:1406.7806v1, Jun. 30, 2014, 5 Pages.

Martens, James, "Deep Learning via Hessian-Free Optimization", In Proceedings of the 27th International Conference on Machine Learning, Jun. 2010, 8 Pages.

McDonald, et al., "Distributed Training Strategies for the Structured Perceptron", In Proceedings of the Annual Conference of the North American Chapter of the Association for Computational Linguistics, Jun. 2, 2010, pp. 456-464.

Moysset, et al., "The A2iA Multi-Lingual Text Recognition System at the Second Maurdor Evaluation", In Proceedings of the 14th International Conference on Frontiers in Handwriting Recognition, Sep. 1, 2014, pp. 297-302.

Niu, et al., "Hogwild!: A Lock-Free Approach to Parallelizing Stochastic Gradient Descent", In Advances in Neural Information Processing Systems, Jun. 2011, 9 Pages.

Rumelhart, et al., "Learning Representations by Back-Propagating Errors", In Proceedings of the Nature, vol. 323, Oct. 9, 1986, pp. 533-536.

Sainath, et al., "Learning the Speech Front-End with Raw Waveform CLDNNs", In Proceedings of the 16th Annual Conference ofthe International Speech Communication Association, 2015, 5 Pages.

Sak, et al., "Fast and Accurate Recurrent Neural Network Acoustic Models for Speech Recognition", In Proceedings of 16th Annual Conference ofthe International Speech Communication Association, Sep. 6, 2015, pp. 1468-1472.

Sak, et al., "Long Short-Term Memory Recurrent Neural Network Architectures for Large Scale Acoustic Modeling", In Proceedings of Fifteenth Annual Conference of the International Speech Communication Association, Sep. 14, 2014, pp. 338-342.

Sak, et al., "Sequence Discriminative Distributed Training of Long Short-Term Memory Recurrent Neural Networks", In Proceedings of 15th Annual Conference of the International Speech Communication Association, Sep. 14, 2014, pp. 1209-1213.

Saon, et al., "The IBM 2015 English Conversational Telephone Speech Recognition System", In Repository of arXiv:1505.05899v1, May 21, 2015, 5 Pages.

Seide, et al., "1-Bit Stochastic Gradient Descent and its Application to Data-Parallel Distributed Training of Speech DNNs", In Proceedings of the 15th Annual Conference of the International Speech Communication Association, Sep. 14, 2014, pp. 1058-1062.

Seide, et al., "Conversational Speech Transcription Using Context-Depedent Deep Neural Networks", In Proceedings ofthe 29th International Conference on International Conference on Machine Learning, Aug. 28, 2011, pp. 437-440.

Simonya, et al., "Very Deep Convolutional Networks for Large-Scale Image Recognition", In Repository of arXiv preprint arXiv:1409.1556v6, Apr. 10, 2015, 14 Pages.

(56) References Cited

OTHER PUBLICATIONS

Strom, Nikko, "Scalable Distributed DNN Training Using Commodity GPU Cloud Computing", In Proceedings of the 16th Annual Conference of the International Speech Communication Association, Sep. 6, 2015, 5 Pages.

Szegedy, et al., "Going Deeper with Convolutions", In Proceedings of the IEEE Conference on Computer Vision and Pattern Recognition, Jun. 7, 2015, pp. 1-9.

Voigtlaender, et al., "Sequence-Discriminative Training of Recurrent Neural Networks", In Proceedings of the IEEE International Conference on Acoustics, Speech and Signal Processing, Apr. 19, 2015, pp. 2100-2104.

Yan, et al., "Designing an MPI-Based Parallel and Distributed Machine Learning Platform on Large-Scale HPC Clusters", In Proceedings of the International Workshop on Statistical Machine Learning for Speech Processing, Mar. 31, 2012, 5 Pages.

Zhang, et al., "Asynchronous Stochastic Gradient Descent for DNN Training", In Proceedings of the IEEE International Conference on Acoustics, Speech and Signal Processing, May 26, 2013, pp. 6660-6663.

Zhang, et al., "Deep Learning with Elastic Averaging SGD", In Repository of arXiv:1412.6651v8, Oct. 25, 2015, 24 Pages.

Zhang, et al., "Improving Deep Neural Network Acoustic Models Using Generalized Maxout Networks", In Proceedings of IEEE International Conference on Acoustics, Speech and Signal Processing, May 4, 2014, 5 Pages.

Zhang, et al., "Parallel Training of DNNs with Natural Gradient and Parameter Averaging", In Repository of arXiv:1410.7455v8, Jun. 22, 2015, 28 Pages.

Zinkevich, et al., "Parallelized Stochastic Gradient Descent", In Proceedings of the Advances in Neural Information Processing Systems, Dec. 6, 2010, 9 Pages.

Chen, et al., "Training Deep Bidirectional LSTM Acoustic Model for LVCSR by a Context-Sensitive-Chunk BPTT Approach", In Proceedings of the IEEE/ACM Transactions on Audio, Speech, and Language Processing, vol. 24, No. 7, Jul. 2016, pp. 1185-1193.

"Supplementary Search Report Issued in European Patent Application No. 16893956.9", dated Jan. 29, 2020, 8 Pages.

SU, et al., "Experiments on Parallel Training of Deep Neural Network Using Model Averaging", In Repository of arXiv, arXiv:1507.01239v1, Jul. 5, 2015, 6 Pages.

Chen, et al., "Scalable Training of Deep Learning Machines by Incremental Block Training with Intra-Block Parallel Optimization and Blockwise Model-Update Filtering", In Proceedings of the IEEE International Conference on Acoustics, Speech and Signal Processing, Mar. 20, 2016, pp. 5880-5884.

Chen, et al., "Training Deep Bidirectional LSTM Acoustic Model for LVCSR by a Context-Sensitive-Chunk BPTT Approach", INTERSPEECH 2015, Sep. 6-10, 2015, Dresden, Germany, pp. 3600-3604.

"Office Action Issued in Indian Patent Application No. 201817034461", dated Jun. 18, 2021, 7 Pages.

"First Office Action and Search Report Issued in Chinese Patent Application No. 201680076481.1", (w/Concise Statement of Relevance), dated Apr. 27, 2021, 13 Pages.

"Second Office Action and Search Report Issued in Chinese Patent Application No. 201680076481.1", dated Sep. 27, 2021, 11 Pages.

Xian, Zhang, "BP Neural Network Training Algorithm Based on Data Parallel", In Master Thesis of Huazhong University of Science and Technology, Dec. 31, 2009, 54 Pages.

* cited by examiner

METHOD AND APPARATUS FOR TRAINING A LEARNING MACHINE

PRIORITY APPLICATION

This application is a U.S. National Stage Filing under 35 U.S.C. 371 from International Application No. PCT/CN2016/076808, filed on Mar. 18, 2016, and published as WO 2017/156791 on Sep. 21, 2017; which application and publication are hereby incorporated by reference in their entirety.

TECHNICAL FIELD

The present disclosure relates generally to learning machine techniques and, more specifically, to a method and apparatus for training a learning machine.

BACKGROUND

Deep learning machines, including a deep neural network (DNN), a convolutional neural network (CNN), a recurrent neural network (RNN) and their variants, have become new state-of-the-art solutions for performing tasks such as speech recognition, image recognition, handwriting analysis and object classification.

A deep learning machine may be trained to perform a particular task using techniques such as mini-batch based stochastic gradient descent (SGD), asynchronous SGD, model averaging, a combination of asynchronous SGD and model averaging, etc. However, each of these techniques has drawbacks. For example, mini-batch based SGD is a sequential training procedure. Accordingly, training of deep learning machines using mini-batch based SGD is difficult to parallelize across multiple computing devices. Further, although techniques such as asynchronous SGD and model averaging may enable the parallelization of training across multiple computing nodes, the deep learning machines that are trained using such techniques generally produce results that are inferior to those produced using mini-batch based SGD.

SUMMARY

Embodiments of the disclosure provide a method and apparatus for training a learning machine, which may speed up training of the learning machine and improve accuracy of the learning machine.

According to an embodiment of the disclosure, a method for training a learning machine may include broadcasting an initial global model for a training cycle to a plurality of worker nodes. The method may also include receiving a plurality of updated local models from the plurality of worker nodes, wherein each updated local model is generated by one of the plurality of worker nodes independently based on a data split assigned to the worker node and the initial global model for the training cycle. The method may also include aggregating the plurality of updated local models to obtain an aggregated model. The method may also include generating an updated global model for the training cycle based at least on the aggregated model and historical information which is obtained from a preceding training cycle.

According to an embodiment of the disclosure, an apparatus for training a learning machine may include a broadcasting module for broadcasting an initial global model for a training cycle to a plurality of worker nodes. The apparatus may also include a receiving module for receiving a plurality of updated local models from the plurality of worker nodes, wherein each updated local model is generated by one of the plurality of worker nodes independently based on a data split assigned to the worker node and the initial global model for the training cycle. The apparatus may also include an aggregating module for aggregating the plurality of updated local models to obtain an aggregated model. The apparatus may also include a generating module for generating an updated global model for the training cycle based at least on the aggregated model and historical information which is obtained from a preceding training cycle.

BRIEF DESCRIPTION OF THE DRAWINGS

The features, nature and advantages of the present disclosure will be more apparent from the detailed description set forth below when taken in conjunction with the drawings in which use of the same reference number in different figures indicates similar or identical items.

DETAILED DESCRIPTION

In the following description, for purposes of explanation, numerous specific details are set forth in order to provide a thorough understanding of one or more embodiments. It may be evident, however, that such embodiment(s) may be practiced without these specific details. In other instances, well-known methods, procedures, components, and circuits have not been illustrated or described in detail so as not to obscure the particular embodiments.

Various embodiments of the disclosure may provide techniques for training a learning machine, which may speed up training of the learning machine and improve accuracy (e.g., recognition accuracy of a classifier, regression accuracy of a regression machine, similarity score of a comparator, etc) of the learning machine. The learning machine may be any type of learning machines, including a deep learning machine (e.g., DNN, CNN, RNN or the like), a shallow learning machine (e.g., a support vector machine (SVM), a boosting machine, a logistic regression machine or the like), or the like.

Figure 1:
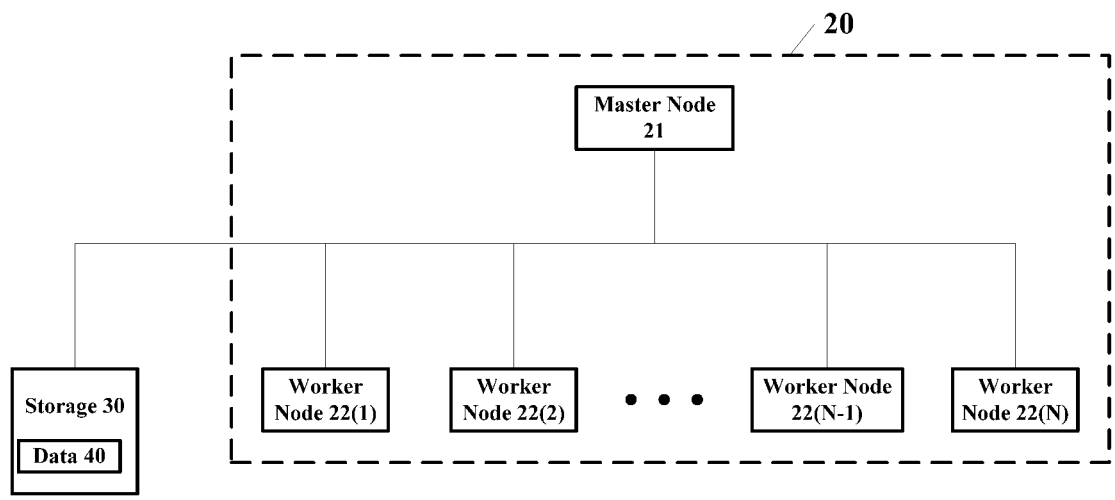
FIG. 1 illustrates an example system for training a learning machine according to an embodiment of the disclosure.

FIG. 1 illustrates an example system for training a learning machine according to an embodiment of the disclosure. The example system 10 may include multiple computing devices 20 and one or more storage devices 30. The computing devices 20 may be coupled to the one or more storage devices 30. In an aspect, the computing devices 20 and storage devices 30 may be configured as a single computer system, or a computer cluster, or other architectures used in a cloud-computing infrastructure.

In an aspect, the computing devices 20 may include general purpose computers, such as desktop computers, tablet computers, laptop computers, servers, and so forth. In another aspect, the computing devices 20 may include smart phones, game consoles, or any other electronic devices. In still another aspect, the computing devices 20 may include various processors, such as central processor units (CPUs), graphics processor units (GPUs), other types of processors, or a combination of any of the above.

In an aspect, one of the computing devices 20 may act as a master node 21 while others of the computing devices 20 may act as worker nodes 22(1)-22(N), wherein N is a positive integer and represents the number of worker nodes. The master node 21 may control the worker nodes 22(1)-22(N) and the worker nodes 22(1)-22(N) may process data. In another aspect, the computing device that acts as the master node 21 may also act as one of the worker nodes. In an aspect, the master node 21 may communicate with the worker nodes 22(1)-22(N) via any wireless and/or wired communication technologies.

The one or more storage devices 30 may store training data 40. In an aspect, in the context of speech recognition, the training data 40 may be a speech corpus that includes a collection of speech samples from human speakers. For example, the speech corpus may include North American English speech samples collected from speakers of North American English in the United States and Canada, Chinese speech samples collected from speakers of Chinese in China, etc. In other aspects, the training data 40 may include images, handwriting samples, and/or other data.

Figure 2:
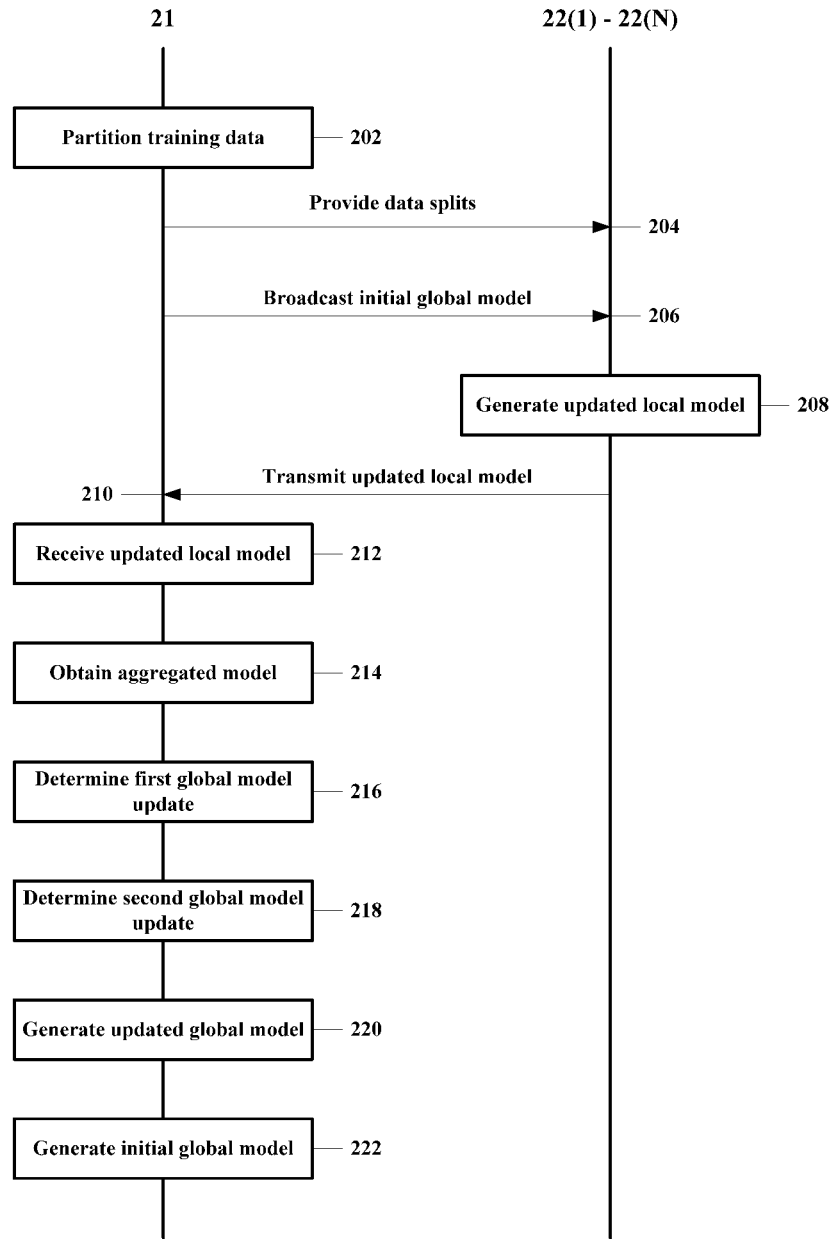
FIG. 2 illustrates an example method for training a learning machine according to an embodiment of the disclosure.

FIG. 2 illustrates an example method for training a learning machine according to an embodiment of the disclosure. The example method shown in FIG. 2 will be described below in conjunction with the example system 10 shown in FIG. 1.

At block 202, the training data 40 stored in the one or more storage devices 30 may be partitioned, for example by the master node 21, into M data blocks. The M data blocks may each be further partitioned into N' data splits each containing multiple mini-batches, wherein M and N' are positive integers. In an aspect, the M data blocks do not overlap with each other, nor do N' data splits of each data block. In this embodiment, N' is equal to N, which is the number of the worker nodes as described above. Depending on the nature of training strategies of the learning machine being used, partitioning of the training data 40 may be done at frame, chunk or sequence level as appropriate for a given system.

At block 204, the master node 21 may provide, for example prior to a training iteration comprising M' training cycles each using one of the M data blocks to train the learning machine, to each of the worker nodes 22(1)-22(N) M' data splits of the training data 40 assigned to the worker node for the training iteration, wherein M' is an integer larger than 1. In this embodiment, M' is equal to M.

For example, if a data split $P_1$ included in the first data block of the training data 40 is assigned to a particular worker node 22(i) for the first training cycle of the training iteration, a data split $P_2$ included in the second data block of the training data 40 is assigned to the particular worker node 22(i) for the second training cycle of the training iteration, ..., a data split $P_{M'-1}$ included in the (M'-1)-th data block of the training data 40 is assigned to the particular worker node 22(i) for the (M'-1)-th training cycle of the training iteration, and a data split $P_{M'}$ included in the M'-th data block of the training data 40 is assigned to the particular worker node 22(i) for the M'-th training cycle of the training iteration, the master node 21 may provide the data splits $P_1$, $P_2$, ..., $P_{M'-1}$ and $P_{M'}$ to the particular worker node 22(i) prior to the training iteration.

In an aspect, providing the data splits to the worker nodes 22(1)-22(N) may be implemented in such a manner that the master node 21 may obtain, from the one or more storage devices 30, the M' data splits assigned to each of the worker nodes 22(1)-22(N) and transmit the obtained M' data splits to the corresponding worker node. In another aspect, providing the data splits to the worker nodes 22(1)-22(N) may implemented in such a manner that the master node 21 may obtain information on the M' data splits assigned to each of the worker nodes 22(1)-22(N) and transmit the obtained information to the corresponding worker node, such that each of the worker nodes 22(1)-22(N) may obtain, from the one or more storage devices 30, the M' data splits assigned to the worker node based on the information received from the master node 21.

At block 206, the master node 21 may broadcast, in a training cycle t of the training iteration (hereafter, the training cycle t may also be denoted as training cycle TC), an initial global model $W_g(t-1)$ for the training cycle TC to the worker nodes 22(1)-22(N).

At block 208, each of the worker nodes 22(1)-22(N) may generate an updated local model independently based on the initial global model $W_g(t-1)$ received from the master node 21 and the data split assigned to the worker node for the training cycle TC. Here, the data splits assigned to the worker nodes 22(1)-22(N) for the training cycle TC are from a data block of the training data 40 for the training cycle TC. In an aspect, the initial global model received from the master node 21 by each of the worker nodes 22(1)-22(N) may be used as an initial local model which is to be updated on that worker node.

In an aspect, each of the worker nodes 22(1)-22(N) may generate an updated local model independently by using one-sweep mini-batch based SGD with momentum trick. For example, assuming that the data split $D_{tk}$ assigned to a worker node 22(k) of the worker nodes 22(1)-22(N) for the training cycle TC may contain τ mini-batches, wherein r is a positive integer, and $w_k(t,\rho)$ may represent the fine-tuned local model after ρ mini-batches of the data split $D_{tk}$ have been processed on the worker node 22(k), wherein ρ is a positive integer not larger than τ, $w_k(t,\rho)$ may be calculated by the following equations (2):

$$w_k(t,0) = W_g(t-1)$$

$$v_k(t,0) = 0$$

$$v_k(t,\rho) = \varepsilon \cdot v_k(t,\rho=1) - (1-e) \cdot \gamma \cdot g(k,t,\rho)$$

$$w_k(t,\rho) = w_k(t,\rho-1) + v_k(t,\rho), \quad (2)$$

wherein ε, γ may represent a momentum and a learning rate, respectively; g(k, t, ρ) may represent a gradient of the ρ-th mini-batch of the data split $D_{tk}$; and $v_k(t,\rho)$ may represent a local model update on the worker node 22(k) after the ρ-th mini-batch of the data split $D_{tk}$ is processed. The fine-tuned local model $w_k(t,\tau)$ after all τ mini-batches of the data split $D_{tk}$ have been processed on the worker node 22(k) is the updated local model generated by the worker node 22(k).

In other aspects, each of the worker nodes 22(1)-22(N) may generate the updated local model independently based on the initial global model $W_g(t-1)$ for the training cycle TC and the data split assigned to the worker node for the training cycle TC by other algorithms such as natural gradient SGD, asynchronous SGD, and so forth.

At block 210, each of the worker nodes 22(1)-22(N) may transmit the updated local model it has generated to the master node 21.

At block 212, the master node 21 may receive N updated local models from the worker nodes 22(1)-22(N).

At block 214, the master node 21 may aggregate the N updated local models to obtain an aggregated model denoted as $\overline{W}(t)$.

In an aspect, the aggregating of the N updated local models may comprise averaging the N updated local models by using the following equation (3) to obtain the aggregated model $\overline{W}(t)$.

$$\overline{W}(t) = \frac{1}{N}\sum_{k=1}^{N} w_k(t, \tau) \quad (3)$$

In other aspects, aggregating the N updated local models may be implemented by any other suitable algorithms.

At block 216, the master node 21 may determine a first global model update G(t) by using the aggregated model $\overline{W}(t)$ and the initial global model $W_g(t-1)$ for the training cycle TC. The first global model update G(t) may be calculated based on the following equation (4).

$$G(t) = \overline{W}(t) - W_g(t-1) \quad (4)$$

The first global model update G(t) is a model update resulting from one data block for the training cycle TC, which includes N' data splits, each being processed on a worker node.

At block 218, the master node 21 may determine a second global model update for the training cycle TC by using the first global model update G(t) and historical information obtained from a training cycle t−1 that precedes the training cycle TC. Hereafter, the training cycle t−1 may also be denoted as the preceding training cycle PC.

In an aspect, the second global model update, denoted as Δ(t), for the training cycle TC may be generated by the following equation (5):

$$\Delta(t) = \eta_t \cdot \Delta(t-1) + \zeta_t \cdot G(t), 0 < \eta_t < 1, \zeta_t > 0 \quad (5)$$

where Δ(t−1) is a second global model update for the preceding training cycle PC which, in an aspect of the disclosure, may represent the historical information obtained from the preceding training cycle PC; $\eta_t$ is a block momentum for the training cycle TC; and $\zeta_t$ is a block learning rate for the training cycle TC. It may be appreciated that, in this aspect, the second global model update Δ(t) for the training cycle TC may represent the historical information obtained from the training cycle TC, which may be used in training cycle(s) following the training cycle TC.

In an aspect, $\zeta_t$ may be equal approximately to 1, and/or $\eta_t$ may be set relatively small if the number of the training cycles in the training iteration is small. For example, $\eta_t$ may be equal approximately to $$1 - \frac{1}{N}$$

if the number of the training cycles in the training iteration is larger than a predefined threshold, and $\eta_t$ may be equal to a value less than $$1 - \frac{1}{N}$$

if the number of the training cycles in the training iteration is not larger than the predefined threshold. In an aspect, the predefined threshold may be set empirically.

In an aspect, $\zeta_t$ may have the same value for different training cycles, and/or $\eta_t$ may have the same value for different training cycles. In another aspect, $\zeta_t$ may have different values for different training cycles, and/or $\eta_t$ may have different values for different training cycles.

At block 220, the master node 21 may generate an updated global model for the training cycle TC by using an updated global model for the preceding training cycle PC and the second global model update for the training cycle TC. In an aspect, the updated global model W(t) for the training cycle TC may be generated by the following equation (6):

$$W(t) = W(t-1) + \Delta(t) \quad (6)$$

where W(t−1) represents the updated global model for the preceding training cycle PC.

At block 222, the master node 21 may generate an initial global model $W_g(t)$ for a training cycle t+1 that follows the training cycle TC. Hereafter, the training cycle t+1 may also be denoted as the following training cycle FC. The initial global model $W_g(t)$ for the following training cycle FC will be broadcasted to the worker nodes 22(1)-22(N) by the master node 21 in the following training cycle FC.

In an aspect, the initial global model $W_g(t)$ for the following training cycle FC may be generated based on the updated global model for the training cycle TC. For example, the initial global model $W_g(t)$ for the following training cycle FC may be the updated global model for the training cycle TC. That is, the initial global model $W_g(t)$ for the following training cycle FC may be calculated by the following equation (7).

$$W_g(t) = W(t) \quad (7)$$

In another aspect, the initial global model $W_g(t)$ for the following training cycle FC may be generated based on the updated global model for the training cycle TC and the historical information obtained from the training cycle TC. For example, the initial global model $W_g(t)$ for the following training cycle FC may be generated based on the updated global model for the training cycle TC and the second global model update for the training cycle TC by the following equation (8):

$$W_g(t) = W(t) + \eta_{t+1} \cdot \Delta(t) \quad (8)$$

where $\eta_{t+1}$ is the block momentum for the following training cycle FC.

It can be appreciated from the above that the initial global model $W_g(t-1)$ for the training cycle TC may be generated based on the updated global model for the preceding training cycle PC, or, may be generated based on the updated global model for the preceding training cycle PC and the historical information obtained from the preceding training cycle PC. For example, It can be appreciated from the equations (7) and (8) that the initial global model $W_g(t-1)$ for the training cycle TC may be the updated global model for the preceding training cycle PC, or, may be generated based on the updated global model for the preceding training cycle PC and the second global model update for the preceding training cycle PC.

In an aspect, blocks 206 to 222 are repeated until the M' training cycles of the training iteration are finished. After the M' training cycles of the training iteration are finished, the master node 21 may determine whether a stopping criterion is satisfied. If it is determined that the stopping criterion is satisfied, the updated global model for the last training cycle of the training iteration may be used as the final global model W(T) for the learning machine. If it is determined that the stopping criterion is not satisfied, another training iteration including M' training cycles is started to continue to train the learning machine.

Combination of the blocks 206-214 may achieve intra-block parallel optimization that utilizes multiple worker nodes 22(1)-22(N) to process data in parallel, thereby speeding up training of the learning machine. The equation (5) may be considered as doing a blockwise model update filtering (BMUF), in light of that it generates the second global model update for the training cycle TC by filtering the first global model update with the historical information from the preceding training cycle PC. The first global model update is the model update resulting from a single data block and is typically noisy. Filtering out of the noisy component of the first global model update with the historical information from the preceding training cycle PC serves to help stabilize learning process. As a result, accuracy of the learning machine trained based on the disclosure suffers from little degradation, compared to the learning machines trained by mini-batch based SGD. On the other hand, accuracy of the learning machine trained based on simple model averaging, which does not use historical information, suffers from significant degradation especially with more parallel worker nodes, compared to the learning machines trained based on the disclosure.

Those skilled in the art will appreciate that although partitioning of the training data 40 is performed by the master node 21 in the above embodiment, the disclosure is not so limited. In other embodiments of the disclosure, partitioning of the training data 40 may also be performed by other suitable devices prior to training of the learning machine.

Those skilled in the art will appreciate that although the historical information generated from the training cycle TC is the second global model update for the training cycle TC in the above embodiment, the disclosure is not so limited. For example, in an embodiment of the disclosure, the historical information from the training cycle TC may be generated based on information including but not limited to the second global model update for the training cycle TC. For example, the historical information from the training cycle TC may be generated based on the second global model update for the training cycle TC and second global model update(s) for training cycle(s) preceding the training cycle TC.

Those skilled in the art will appreciate that although the data splits of the training data 40 assigned to each of the worker nodes 22(1)-22(N) for the training iteration is provided to the worker node prior to the training iteration in the above embodiment, the disclosure is not so limited. In other embodiments of the disclosure, a data split of the training data 40 assigned to each of the worker nodes 22(1)-22(N) for any particular training cycle of the training iteration may be provided to the worker node by the master node 21 during the particular training cycle.

Those skilled in the art will also appreciate that although the initial global model for the following training cycle FC is generated in the training cycle TC in the above embodiment, the disclosure is not so limited. In other embodiments of the disclosure, for example, the initial global model for a training cycle may be generated at the beginning of the training cycle.

Those skilled in the art will also appreciate that although N' is equal to N and M' is equal to M in the above embodiment, the disclosure is not so limited. In other embodiments of the disclosure, N' may be different from N and/or M' may be different from M. For example, N' is equal to 2N such that each worker node may process two data splits in a training cycle.

Figure 3:
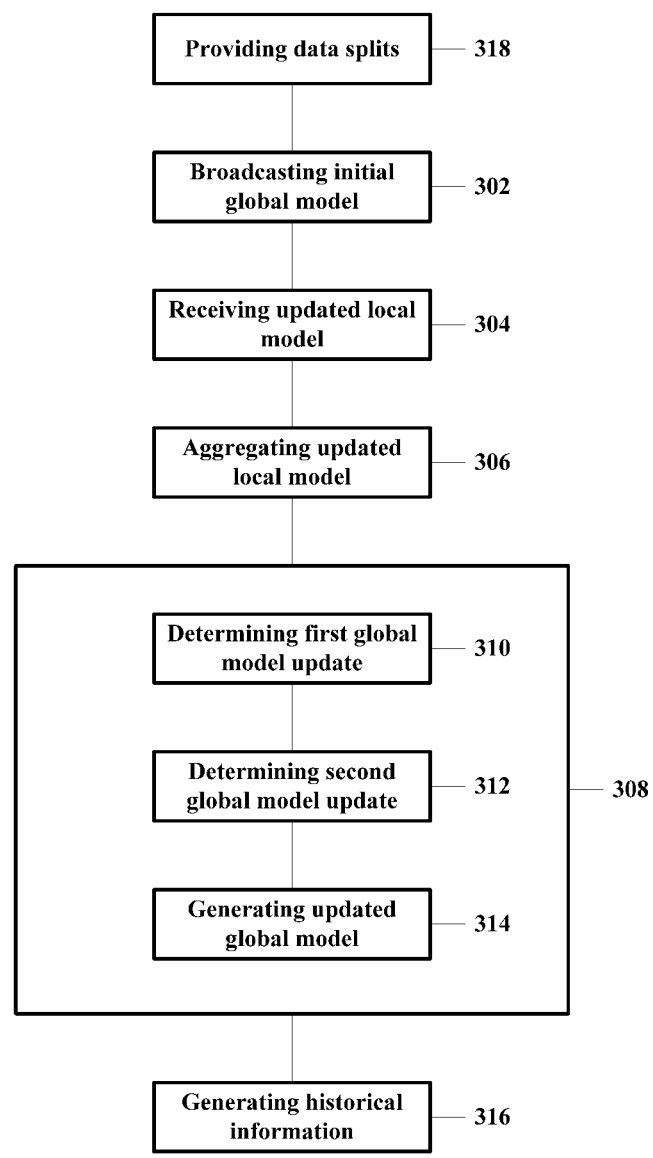
FIG. 3 illustrates a method for training a learning machine according to an embodiment of the disclosure.

FIG. 3 illustrates a method for training a learning machine according to an embodiment of the disclosure. As an example, the method 300 shown in FIG. 3 may be implemented by the master node 21.

The method 300 may include, at block 302, broadcasting an initial global model for a training cycle to a plurality of worker nodes. The method 300 may also include, at block 304, receiving a plurality of updated local models from the plurality of worker nodes, wherein each updated local model is generated by one of the plurality of worker nodes independently based on a data split assigned to the worker node and the initial global model for the training cycle. The method 300 may also include, at block 306, aggregating the plurality of updated local models to obtain an aggregated model. The method 300 may also include, at block 308, generating an updated global model for the training cycle based at least on the aggregated model and historical information which is obtained from a preceding training cycle.

In a first aspect, block 308 may include block 310, where a first global model update is determined based on the aggregated model and the initial global model for the training cycle. Block 308 may also include block 312, where a second global model update is determined based on the historical information from the preceding training cycle and the first global model update. Block 308 may also include block 314, where the updated global model for the training cycle is generated based on an updated global model for the preceding training cycle and the second global model update.

In a second aspect, the initial global model for the training cycle may be an updated global model for the preceding training cycle.

In a third aspect, the initial global model for the training cycle may be determined based on an updated global model for the preceding training cycle and the historical information from the preceding training cycle.

In a fourth aspect, each updated local model may be generated by one of the following algorithms: a one-sweep mini-batch stochastic gradient descent (SGD) with momentum trick, a natural gradient SGD, and an asynchronous SGD (ASGD).

In a fifth aspect, the method 300 may further include, at block 316, generating historical information from the training cycle based on the second global model update.

In a sixth aspect, the historical information from the training cycle $\Delta(t)$ may be generated by the following equation:

$$\Delta(t)=\eta_t \cdot \Delta(t-1)+\zeta_t \cdot G(t), 0<\eta_t<1, \zeta_t>0,$$

wherein $\Delta(t-1)$ represents the historical information from the preceding training cycle; $G(t)=\overline{W}(t)-W_g(t-1)$, wherein $\overline{W}(t)$ represents the aggregated model, and $W_g(t-1)$ represents the initial global model for the training cycle; $\eta_t$ is a block momentum for the training cycle; and $\zeta_t$ is a block learning rate for the training cycle.

In a seventh aspect, $\zeta_t$ may be equal approximately to 1.

In an eighth aspect, $\eta_t$ may be set relatively small if the number of the training cycles in a training iteration is small.

In a ninth aspect, block 306 may further include averaging the plurality of updated local models to obtain the aggregated model.

In a tenth aspect, the method 300 may further include, at block 318, providing, prior to a training iteration comprising M' training cycles, to each worker node M' data splits that are assigned to the worker node for the training iteration, wherein M' is an integer larger than 1.

Figure 4:
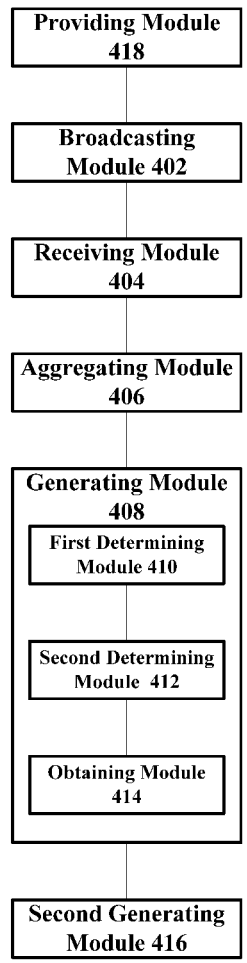
FIG. 4 illustrates an apparatus for training a learning machine according to an embodiment of the disclosure.

FIG. 4 illustrates an apparatus for training a learning machine according to an embodiment of the disclosure.

The apparatus 400 may include a broadcasting module 402, a receiving module 404, an aggregating module 406 and a generating module 408. The broadcasting module 402 may be configured for broadcasting an initial global model for a training cycle to a plurality of worker nodes. The receiving module 404 may be configured for receiving a plurality of updated local models from the plurality of worker nodes, wherein each updated local model is generated by one of the plurality of worker nodes independently based on a data split assigned to the worker node and the initial global model for the training cycle. The aggregating module 406 may be configured for aggregating the plurality of updated local models to obtain an aggregated model. The generating module 408 may be configured for generating an updated global model for the training cycle based at least on the aggregated model and historical information which is obtained from a preceding training cycle.

In a first aspect, the generating module 408 may include a first determining module 410, a second determining module 412 and an obtaining module 414. The first determining module 410 may be configured for determining a first global model update based on the aggregated model and the initial global model for the training cycle. The second determining module 412 may be configured for determining a second global model update based on the historical information from the preceding training cycle and the first global model update. The obtaining module 414 may be configured for generating the updated global model for the training cycle based on an updated global model for the preceding training cycle and the second global model update.

In a second aspect, the initial global model for the training cycle may be an updated global model for the preceding training cycle.

In a third aspect, the initial global model for the training cycle may be determined based on an updated global model for the preceding training cycle and the historical information from the preceding training cycle.

In a fourth aspect, each updated local model may be generated by one of the following algorithms: a one-sweep mini-batch stochastic gradient descent (SGD) with momentum trick, a natural gradient SGD, and an asynchronous SGD (ASGD).

In a fifth aspect, the apparatus 400 may further include: a second generating module 416 for generating historical information from the training cycle based on the second global model update.

In a sixth aspect, the historical information from the training cycle $\Delta(t)$ may be generated by the following equation:

$$\Delta(t)=\eta_t \cdot \Delta(t-1)+\zeta_t \cdot G(t), 0<\eta_t<1, \zeta_t>0,$$

wherein $\Delta(t-1)$ represents the historical information from the preceding training cycle; $G(t)=\overline{W}(t)-W_g(t-1)$, wherein $\overline{W}(t)$ represents the aggregated model, and $W_g(t-1)$ represents the initial global model for the training cycle; $\eta_t$ is a block momentum for the training cycle; and $\zeta_t$ is a block learning rate for the training cycle.

In a seventh aspect, $\zeta_t$ may be equal approximately to 1.

In an eighth aspect, $\eta_t$ may be set relatively small if the number of the training cycles in a training iteration is small.

In a ninth aspect, the aggregating module 406 may be further configured for: averaging the plurality of updated local models to obtain the aggregated model.

In a tenth aspect, the apparatus 400 may further include a providing module 418 for providing, prior to a training iteration comprising M' training cycles, to each worker node M' data splits that are assigned to the worker node for the training iteration, wherein M' is an integer larger than 1.

The various modules in FIG. 4 may be implemented as electronic hardware, computer software, or combination of both. To clearly illustrate this interchangeability of hardware and software, the modules have been described above generally in terms of their functionality. Whether such functionality is implemented as hardware or software depends upon the particular application and design constrains imposed on the overall system. Skilled artisans may implement the described functionality in varying ways for each particular application, but such implementation decisions should not be interpreted as causing a departure from the scope of the disclosure.

The various modules in FIG. 4 may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessor in conjunction with a DSP core, or any other such configuration.

Figure 5:
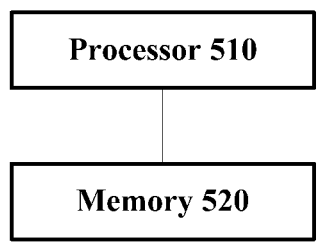
FIG. 5 illustrates a device for training a learning machine according to an embodiment of the disclosure.

FIG. 5 illustrates a device for training a learning machine according to an embodiment of the disclosure. The device 500 shown in FIG. 5 may implement the master node 21, for example.

The device 500 may comprise one or more processors 510 and a memory 520 for storing computer-executable instructions that, when executed, cause the one or more processors 510 to perform acts included in the method 300. In an aspect, the modules included in the apparatus 400 may be embodied as the computer-executable instructions stored in the memory 520.

Embodiments of the disclosure may also provide a computer-readable medium having thereon computer-executable instructions that are executable to cause one or more processors to perform acts included in the method 300. In an aspect, the modules included in the apparatus 400 may be embodied as the computer-executable instructions on the computer-readable medium.

Embodiments of the disclosure may provide a method for training a learning machine. The method may comprise: broadcasting an initial global model for a training cycle to a plurality of worker nodes; receiving a plurality of updated local models from the plurality of worker nodes, wherein each updated local model is generated by one of the plurality of worker nodes independently based on a data split assigned to the worker node and the initial global model for the training cycle; aggregating the plurality of updated local models to obtain an aggregated model; and generating an updated global model for the training cycle based at least on the aggregated model and historical information which is obtained from a preceding training cycle.

In an aspect, generating an updated global model for the training cycle may further comprise: determining a first global model update based on the aggregated model and the initial global model for the training cycle; determining a second global model update based on the historical information from the preceding training cycle and the first global model update; and generating the updated global model for the training cycle based on an updated global model for the preceding training cycle and the second global model update.

In an aspect, the initial global model for the training cycle is an updated global model for the preceding training cycle; or the initial global model for the training cycle is determined based on an updated global model for the preceding training cycle and the historical information from the preceding training cycle.

In an aspect, each updated local model is generated by one of the following algorithms: a one-sweep mini-batch stochastic gradient descent (SGD) with momentum trick, a natural gradient SGD, and an asynchronous SGD (ASGD).

In an aspect, the method may further comprise: generating historical information from the training cycle based on the second global model update.

In an aspect, the historical information from the training cycle $\Delta(t)$ is generated by the following equation:

$$\Delta(t)=\eta_t \cdot \Delta(t-1)+\zeta_t \cdot G(t), 0<\eta_t<1, \zeta_t>0,$$

wherein $\Delta(t-1)$ represents the historical information from the preceding training cycle; $G(t)=\overline{W}(t)-W_g(t-1)$, wherein $\overline{W}(t)$ represents the aggregated model, and $W_g(t-1)$ represents the initial global model for the training cycle; $\eta_t$ is a block momentum for the training cycle; and $\zeta_t$ is a block learning rate for the training cycle.

In an aspect, $\zeta_t$ is equal approximately to 1.

In an aspect, $\eta_t$ is set relatively small if the number of the training cycles in a training iteration is small.

In an aspect, aggregating the plurality of updated local models may further comprise: averaging the plurality of updated local models to obtain the aggregated model.

In an aspect, the method may further comprise: providing, prior to a training iteration comprising M' training cycles, to each worker node M' data splits that are assigned to the worker node for the training iteration, wherein M' is an integer larger than 1.

Embodiments of the disclosure may provide an apparatus for training a learning machine. The apparatus may comprise: a broadcasting module for broadcasting an initial global model for a training cycle to a plurality of worker nodes; a receiving module for receiving a plurality of updated local models from the plurality of worker nodes, wherein each updated local model is generated by one of the plurality of worker nodes independently based on a data split assigned to the worker node and the initial global model for the training cycle; an aggregating module for aggregating the plurality of updated local models to obtain an aggregated model; and a generating module for generating an updated global model for the training cycle based at least on the aggregated model and historical information which is obtained from a preceding training cycle.

In an aspect, the generating module may be further configured for: determining a first global model update based on the aggregated model and the initial global model for the training cycle; determining a second global model update based on the historical information from the preceding training cycle and the first global model update; and generating the updated global mode for the training cycle based on an updated global model for the preceding training cycle and the second global model update.

In an aspect, the initial global model for the training cycle is an updated global model for the preceding training cycle; or the initial global model for the training cycle is determined based on the updated global model for the preceding training cycle and the historical information from the preceding training cycle.

In an aspect, the apparatus may further comprise: a module for generating historical information from the training cycle based on the second global model update.

In an aspect, the historical information from the training cycle $\Delta(t)$ is generated by the following equation:

$$\Delta(t)=\eta_t \cdot \Delta(t-1)+\zeta_t \cdot G(t), 0<\eta_t<1, \zeta_t>0,$$

wherein $\Delta(t-1)$ represents the historical information from the preceding training cycle; $G(t)=\overline{W}(t)-W_g(t-1)$, wherein $\overline{W}(t)$ represents the aggregated model, and $W_g(t-1)$ represents the initial global model for the training cycle; $\eta_t$ is a block momentum for the training cycle; and $\zeta_t$ is a block learning rate for the training cycle.

In an aspect, $\zeta_1$ is equal approximately to 1.

In an aspect, $\eta_t$ is set relatively small if the number of the training cycles in a training iteration is small.

In an aspect, the aggregating module is further configured for averaging the plurality of updated local models to obtain the aggregated model.

Embodiments of the disclosure may provide a device for training a learning machine. The device may comprise: one or more processors; and a memory storing computer-executable instructions that, when executed, cause the one or more processors to perform acts of the above method for training a learning machine.

Embodiments of the disclosure may provide a system. The system may comprise: one or more storage devices for storing training data for training a learning machine; a plurality of worker nodes; and a master node for performing acts of the above method for training a learning machine.

Although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:
1. A method for training a learning machine, comprising:
broadcasting an initial global model for a training cycle to a plurality of worker nodes;
receiving a plurality of updated local models from the plurality of worker nodes, wherein each updated local model is generated by one of the plurality of worker nodes independently based on a data split assigned to the worker node and the initial global model for the training cycle;
aggregating the plurality of updated local models to obtain an aggregated model;
generating an updated global model for the training cycle based at least on the aggregated model and historical information which is obtained from a preceding training cycle;
determining a first global model update based on the aggregated model and the initial global model for the training cycle;
filtering the first global model update using the historical information from the preceding training cycle to determine a second global model update; and
generating an updated global model for the training cycle based on an updated global model for the preceding training cycle and the second global model update.

2. The method of claim 1, wherein
the initial global model for the training cycle is an updated global model for the preceding training cycle; or
the initial global model for the training cycle is determined based on an updated global model for the preceding training cycle and the historical information from the preceding training cycle.

3. The method of claim 1, wherein
each updated local model is generated by one of the following algorithms:
a one-sweep mini-batch stochastic gradient descent (SGD) with momentum trick, a natural gradient SGD, and an asynchronous SGD (ASCD).

4. The method of claim 1, further comprising:
generating historical information from the training cycle based on the second global model update.

5. The method of claim 4, wherein the historical information from the training cycle $\Delta(t)$ is generated by the following equation:

$$\Delta(t) = \eta_t \cdot \Delta(t-1) + \zeta_t \cdot G(t), 0 < \eta_t < 1, \zeta_t > 0,$$

wherein $\Delta(t-1)$ represents the historical information from the preceding training cycle,
$G(t) = \overline{W}(t) - W_z(t-1)$, wherein $\overline{W}(t)$ represents the aggregated model, and $W_s(t-1)$ represents the initial global model for the training cycle,
$\eta_t$ is a block momentum for the training cycle, and
$\zeta_t$ is a block learning rate for the training cycle.

6. The method of claim 5, wherein
$\zeta_t$ is determined based on a number of training cycles in a set of training cycles that includes the training cycle.

7. The method of claim 5, wherein
$\eta_t$ is set based on a number of training cycles in a set of training cycles that includes the training cycle.

8. The method of claim 1, wherein aggregating the plurality of updated local models further comprises:
averaging the plurality of updated local models to obtain the aggregated model.

9. The method of claim 1, further comprising:
providing, prior to a training iteration comprising M' training cycles, to each worker node M' data splits that are assigned to the worker node for the training iteration, wherein M' is an integer larger than 1.

10. An apparatus for training a learning machine, comprising:
at least one processor; and
memory including instructions that, whenexecuted by the at least one processor, cause the at least one processor to perform operations to:
broadcast an initial global model for a training cycle to a plurality of worker nodes;
receive a plurality of updated local models from the plurality of worker nodes, wherein each updated local model is generated by one of the plurality of worker nodes independently based on a data split assigned to the worker node and the initial global model for the training cycle;
aggregate the plurality of updated local models to obtain an aggregated model;
generate an updated global model for the training cycle based at least on the aggregated model and historical information which is obtained from a preceding training cycle;
determine a first global model update based on the aggregated model and the initial global model for the training cycle;
filter the first global model update using the historical information from the preceding training cycle to determine a second global model update; and
generate an updated global model for the training cycle based on an updated global model for the preceding training cycle and the second global model update.

11. The apparatus of claim 10, wherein
the initial global model for the training cycle is an updated global model for the preceding training cycle; or
the initial global model for the training cycle is determined based on the updated global model for the preceding training cycle and the historical information from the preceding training cycle.

12. The apparatus of claim 10, the memory further comprising instructions that, when executed by the at least one processor, cause the at least one processor to perform operations to:
generate historical information from the training cycle based on the second global model update.

13. The apparatus of claim 12, wherein the historical information from the training cycle $\Delta(t)$ is generated by the following equation:

$$\Delta(t) = \eta_t \cdot \Delta(t-1) + \zeta_t \cdot G(t), 0 < \eta_t < 1, \zeta_t > 0,$$

wherein $\Delta(t-1)$ represents the historical information from the preceding training cycle,
$G(t) = \overline{W}(t) - W_g(t-1)$, wherein $\overline{W}(t)$ represents the aggregated model, and
$W_g(t-1)$ represents the initial global model for the training cycle,
$\eta_t$ is a block momentum for the training cycle, and
$\zeta_t$ is a block learning rate for the training cycle.

14. The apparatus of claim 13, wherein
$\zeta_t$ is determined based on a number of training cycles in a set of training cycles that includes the training cycle.

15. The apparatus of claim 13, wherein
$\eta_t$ is set based on a number of training cycles in a set of training cycles that includes the training cycle.

16. The apparatus of claim 10, the memory further comprising instructions that, when executed by the at least one processor, cause the at least one processor to perform operations to:
average the plurality of updated local models to obtain the aggregated model.

17. A device for training a learning machine, comprising:
one or more processors; and
a memory storing computer-executable instructions that, when executed, cause the one or more processors to perform acts of claim 1.

18. A system, comprising:
one or more storage devices for storing training data for raining a learning machine;
a plurality of worker nodes; and
a master node for performing acts of claim 1.

* * * * *